(12) United States Patent
Dorren

(10) Patent No.: US 6,541,976 B1
(45) Date of Patent: Apr. 1, 2003

(54) UNDER AND ABOVE GROUND, RADIO FREQUENCY DRIVEN ELEMENT, METAL LOCATING SYSTEM

(75) Inventor: Louis Dorren, Millbrae, CA (US)

(73) Assignee: Geometrics Group, Inc., San Jose, CA (US)

( * ) Notice: Subject to any disclaimer, the term of this patent is extended or adjusted under 35 U.S.C. 154(b) by 0 days.

(21) Appl. No.: 09/734,963

(22) Filed: Dec. 11, 2000

Related U.S. Application Data

(60) Provisional application No. 60/172,391, filed on Dec. 17, 1999.

(51) Int. Cl.$^7$ ............................. G01V 3/11; G01V 3/165
(52) U.S. Cl. .................................... 324/326; 324/67
(58) Field of Search ..................... 324/326, 67

(56) References Cited

U.S. PATENT DOCUMENTS

| | | | | |
|---|---|---|---|---|
| 3,418,572 A | * | 12/1968 | Humphreys, Jr. ............ | 324/67 |
| 4,161,686 A | * | 7/1979 | Weber ......................... | 324/326 |
| 4,233,561 A | * | 11/1980 | Haddon et al. .............. | 324/326 |
| 4,263,552 A | * | 4/1981 | Weber ......................... | 324/326 |
| 4,390,836 A | * | 6/1983 | Bruce et al. ............. | 324/326 X |
| 4,438,389 A | * | 3/1984 | De Sa ..................... | 324/326 X |
| 4,652,861 A | * | 3/1987 | Domes ..................... | 324/67 X |
| 5,001,430 A | * | 3/1991 | Peterman et al. ........... | 324/326 |
| 5,467,011 A | * | 11/1995 | Hunt ........................... | 324/67 |
| 6,005,396 A | * | 12/1999 | Suyama et al. ............. | 324/639 |
| 6,097,189 A | * | 8/2000 | Arndt et al. ................ | 324/326 |

* cited by examiner

Primary Examiner—Gerard R. Strecker
(74) Attorney, Agent, or Firm—Townsend and Townsend and Crew LLP; Henry K. Woodward

(57) ABSTRACT

A metal locating system includes a first transmitter unit and a second receiver detector unit for locating an under and above ground radio frequency driven element such as a pipe. The first unit is a radio frequency transmitter operating at radio frequencies and coupled to the driven element as a loss line antenna. The receiver second unit is a switched diversity antenna connected to a radio FM receiver and a differential phase detection system. When the first unit is driven by the driven element, the second unit is able to detect and trace the position of the driven element relative to the switched diversity antenna.

10 Claims, 5 Drawing Sheets

UNDER AND ABOVE GROUND, RADIO FREQUENCY DRIVEN ELEMENT, METAL LOCATING SYSTEM

CROSS-REFERENCES TO RELATED APPLICATIONS

This patent application claims the benefit of Provisional Application No. 60/172,391 filed Dec. 17, 1999, the disclosure of which is incorporated herein by reference for all purposes.

BACKGROUND OF THE INVENTION

This invention relates generally to metal detection apparatus, and more particularly the invention relates to a system which detects signals emitted from a metal object such as an underground pipe.

In the construction and utility maintenance fields, the ability to trace underground metal and underground piping has been a needed requirement for both safety and maintenance purposes. Currently available equipment to do this job uses very low frequency systems for detection and tracing. These frequencies may start at 1 kHz and go as high as 490 kHz.

The ability to detect and trace underground piping is greatly affected by the environment that exists at the time of detection. If the ground is very wet or is made of different combinations of earth, erroneous results may occur. If the underground pipe or metal contains an insulating gasket, this may limit the distance at which the pipe can be traced due to the gasket acting like a very low value capacitor. This capacitor is a high impedance to the very low frequency signals, thus preventing them from jumping across the gasket. In addition, the ability to couple the low frequency energy to the underground metal or pipe becomes very difficult. The extreme low frequency makes necessary a very high voltage for the pipe to emit enough signal to be detected.

SUMMARY OF THE INVENTION

In accordance with the invention, the location of a metal object such as an underground pipe is detected by first applying an electrical signal to the object for transmission at a transmission frequency. The transmitted signal from the object is then received with a pair of spaced antennas. The received signals from the antennas are applied through a switch to a FM demodulator receiver. The switch alternately connects the antennas at a switch frequency whereby the FM demodulator produces a phase variable signal at the switch frequency. The amplitude of the phase variable signal is detected whereby a null indicates that the antennas are equal distance from the metal object. The phase of the phase variable signal is compared with the switch signal as a reference whereby the phase indicates relative positioning of the antennas with respect to the metal object.

In a preferred embodiment the transmitter section comprises a radio frequency oscillator and a radio frequency power amplifier. The output of the radio frequency power amplifier is connected to an impedance matching network. This network is used to turn the pipe or metal that is being driven into a loss transmission line radiator. This type of transmission line has the characteristic of matching the transmitter impedance very well. Over its length however it has a relatively high resistance which allows the electrical signal that is coupled to it to be electromagnetically radiated. The pipe or metal acts as a single element, surface effect, low transmission line electromagnetic transducer (antenna) and therefore does not require a signal return.

The receiver section in the preferred embodiment includes a pair of antennas, an antenna selecting switch, a matching network, a radio frequency modulation demodulator receiver, a synchronized clock circuit, an ultra high Q band pass filter, a differential phase detector, and phase and amplitude indicators.

The antennas must be of the same type and are spaced at an odd wavelength increment. The antennas are connected to the selection switch which is driven by a clock signal from the synchronized clock generator. The output from this switch feeds the RF input of the FM demodulator receiver. The detection output of the receiver feeds the band pass filter and the output of the band pass filter feeds one port of the phase detector. The other port of the phase detector is fed from a reference signal generated by the synchronized clock generator. This provides synchronized switching signals for the antenna switch as well as a synchronized reference signal for the phase detector. The output of the band pass filter also feeds an amplitude indicator, while the output of the phase detector feeds a phase difference indicator.

Since the two antennas are identical they have identical pickup patterns. When both antennas are not over and equidistance from the driven pipe, and are being switched back and forth rapidly by the signal from the synchronized clock generator, there is a phase modulation developed at the receive frequency. Phase modulation like frequency modulation can be demodulated by a FM demodulator receiver. The output of the FM receiver comes through as a tone with a specific phase in reference to the rate at which the antennas are being switched. As the antennas are moved over the pipe so that the receive distance to both antennas is the same, the tone disappears and a null is achieved. This is displayed on the amplitude indicator. When the switched antenna array is moved either to the left of the pipe or to the right of the pipe, the phase of the resulting FM demodulated signal shifts in respect to the switched antennas. The shift in the detected phase drives the phase indicator.

The invention and objects and features thereof will be more readily apparent from the following detailed description and appended claims when taken with the drawings.

DESCRIPTION OF THE SPECIFIC EMBODIMENTS

Figure 1:
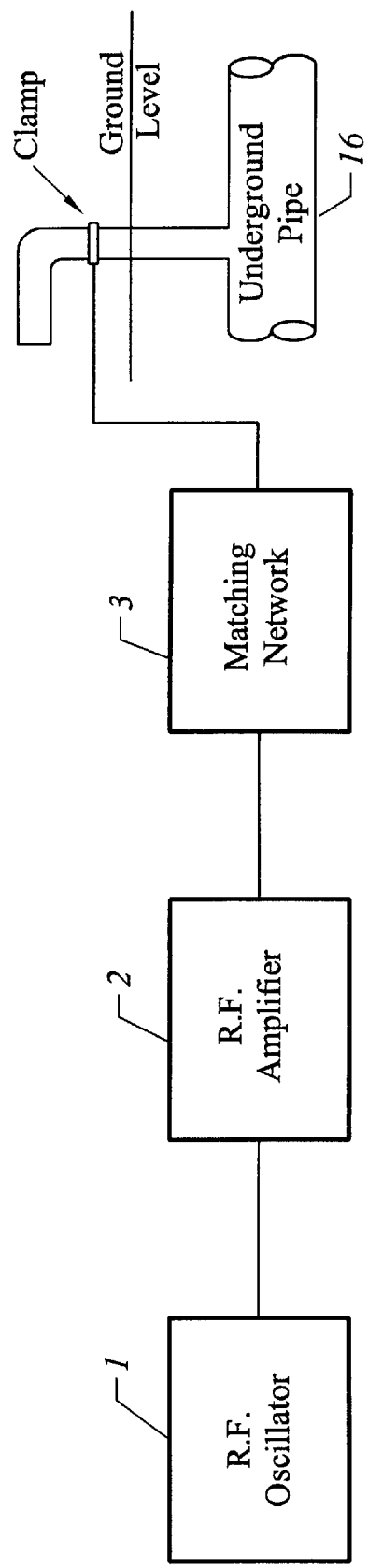
FIG. 1 is a block diagram of the transmitter with a connection to an underground pipe.

The invention includes two units operating at radio frequencies with the frequencies in the very low to ultra high frequency range frequency range (VLF to UHF). FIG. 1 is a block diagram of the transmitter of the system including an RF oscillator 1, and RF amplifier 2. The output of the RF oscillator 1 feeds the input of RF amplifier 2. The output of RF amplifier 2 feeds an impedance matching network 3. This matching network 3 is used to maximize the power transfer between the RF amplifier 2 and the metal or pipe 16.

Figure 2:
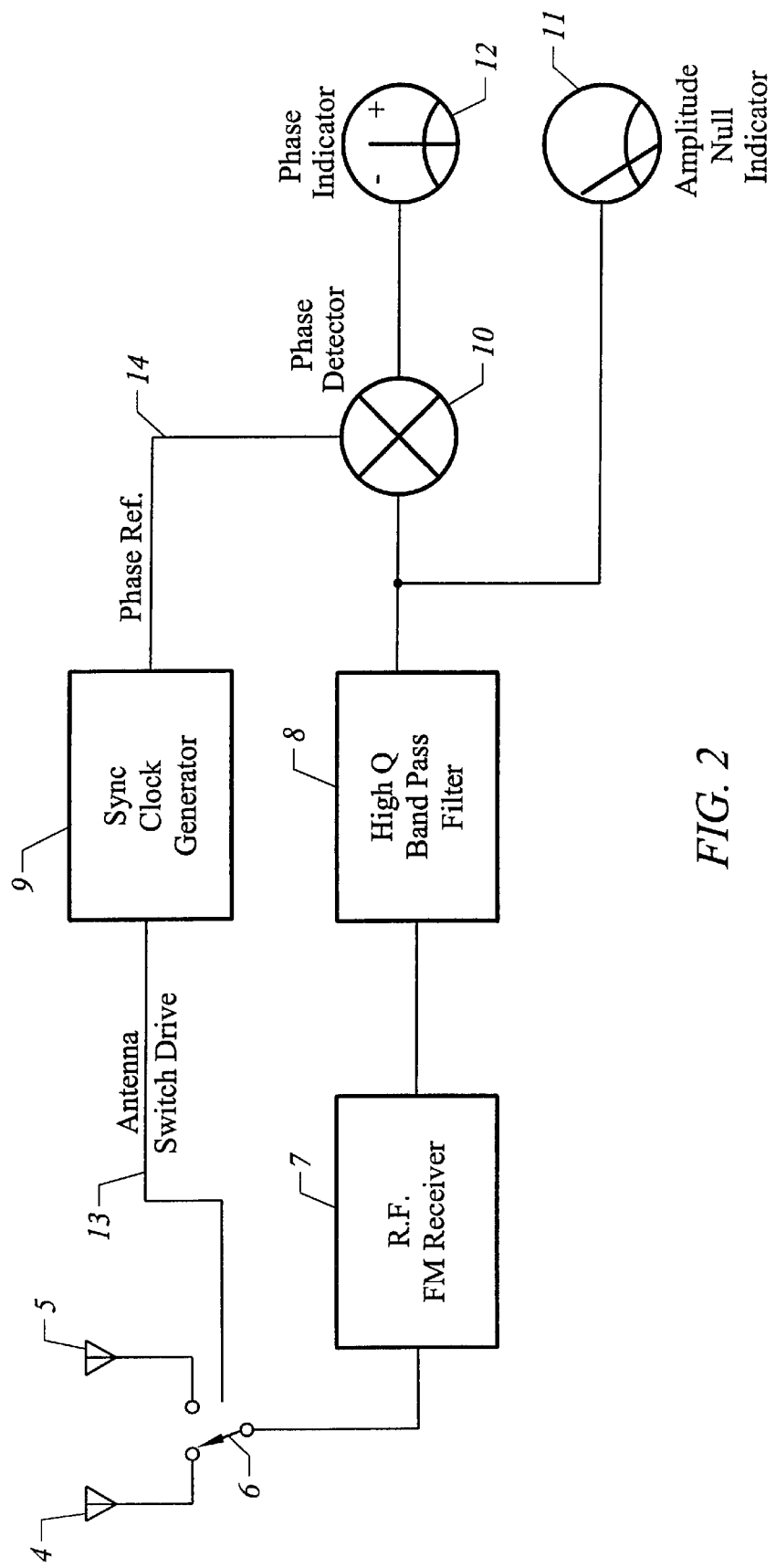
FIG. 2 is a block diagram of the receiver and phase detector unit.

FIG. 2 is a block diagram of the receiver unit of the system. A first antenna 4 and a second antenna 5 feed the antenna selection switch 6. The antenna selection switch control signal on line 13 comes from a synchronous clock generator 9 which can be in the audio frequency range, or other frequency ranges. The output of the antenna switch 6 feeds the input of the RF FM demodulator receiver 7. The demodulated output of receiver 7 feeds the input of a high Q band pass filter 8. The output of the band pass filter 8 feeds one port of phase detector 10 and amplitude indicator 11. The other port of phase detector 10 is fed a phase reference signal from synchronous clock generator 9 through line 14. The output of phase detector 10 feeds phase indicator 12.

The RF signal radiated by the underground metal or pipe is picked up by the two antennas 4 and 5. The RF FM receiver 7 amplifies and demodulates the incoming RF signal from the antenna switch 6. The demodulated output from receiver 7 is fed to high Q band pass filter 8 which removes all extraneous signals and noise and passes only the demodulated phase signal created at the antenna and switch 6. This signal is then fed to one port of the phase detector 10 while the other port of the phase detector is fed with the phase reference signal online 14. The output of phase detector 10 is a voltage proportional to the difference of phase of the reference signal and the output of the high Q band pass filter 8.

Figure 3:
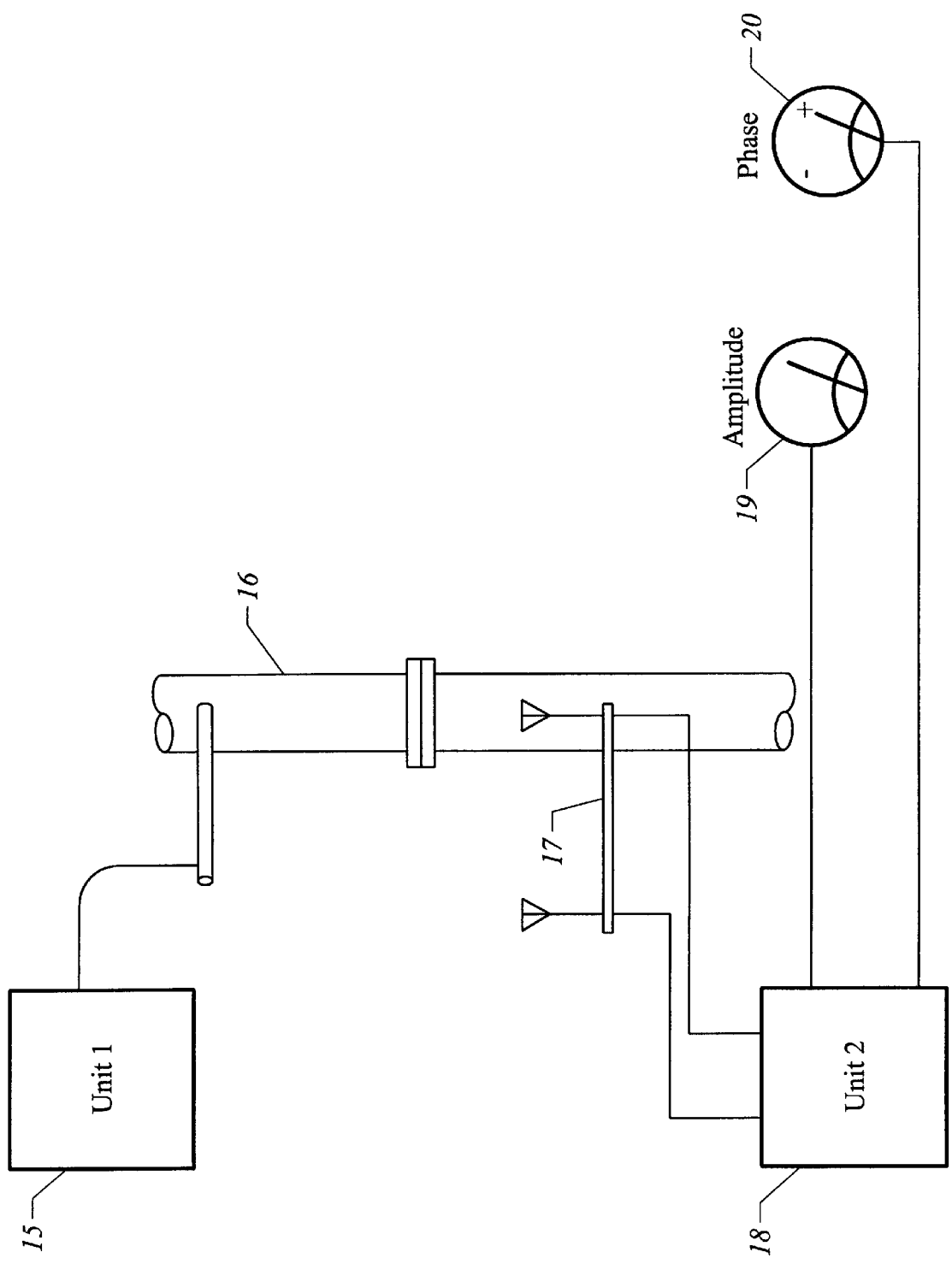
FIG. 3 illustrates the detection system when the antennas are to the left of the underground pipe, demonstrating the typical readings of the amplitude and phase indicators for this condition.
Figure 4:
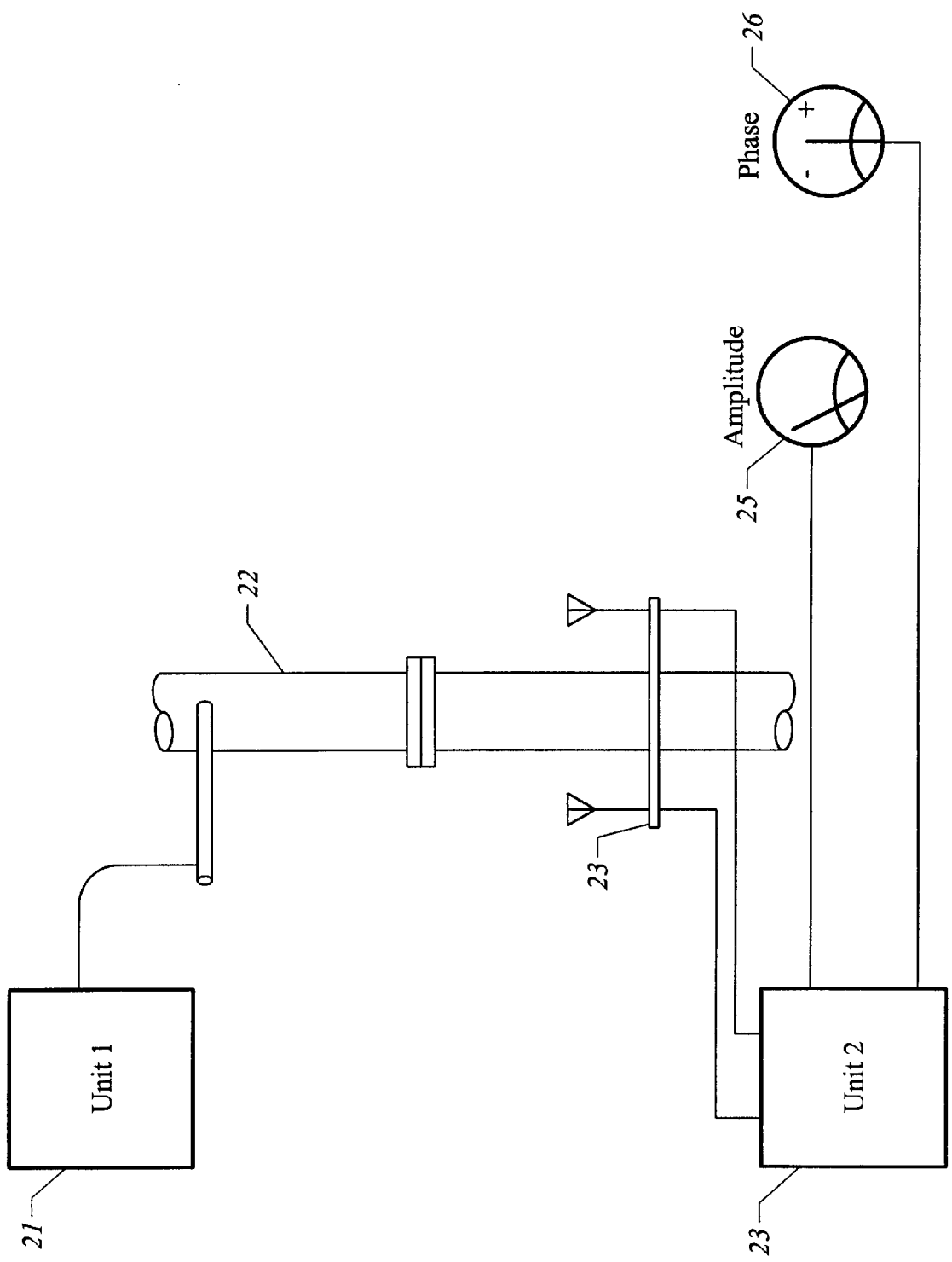
FIG. 4 illustrates the detection system when the antennas are directly over and equidistant from the underground pipe, also demonstrating the typical readings of the amplitude and phase indicators for this condition.
Figure 5:
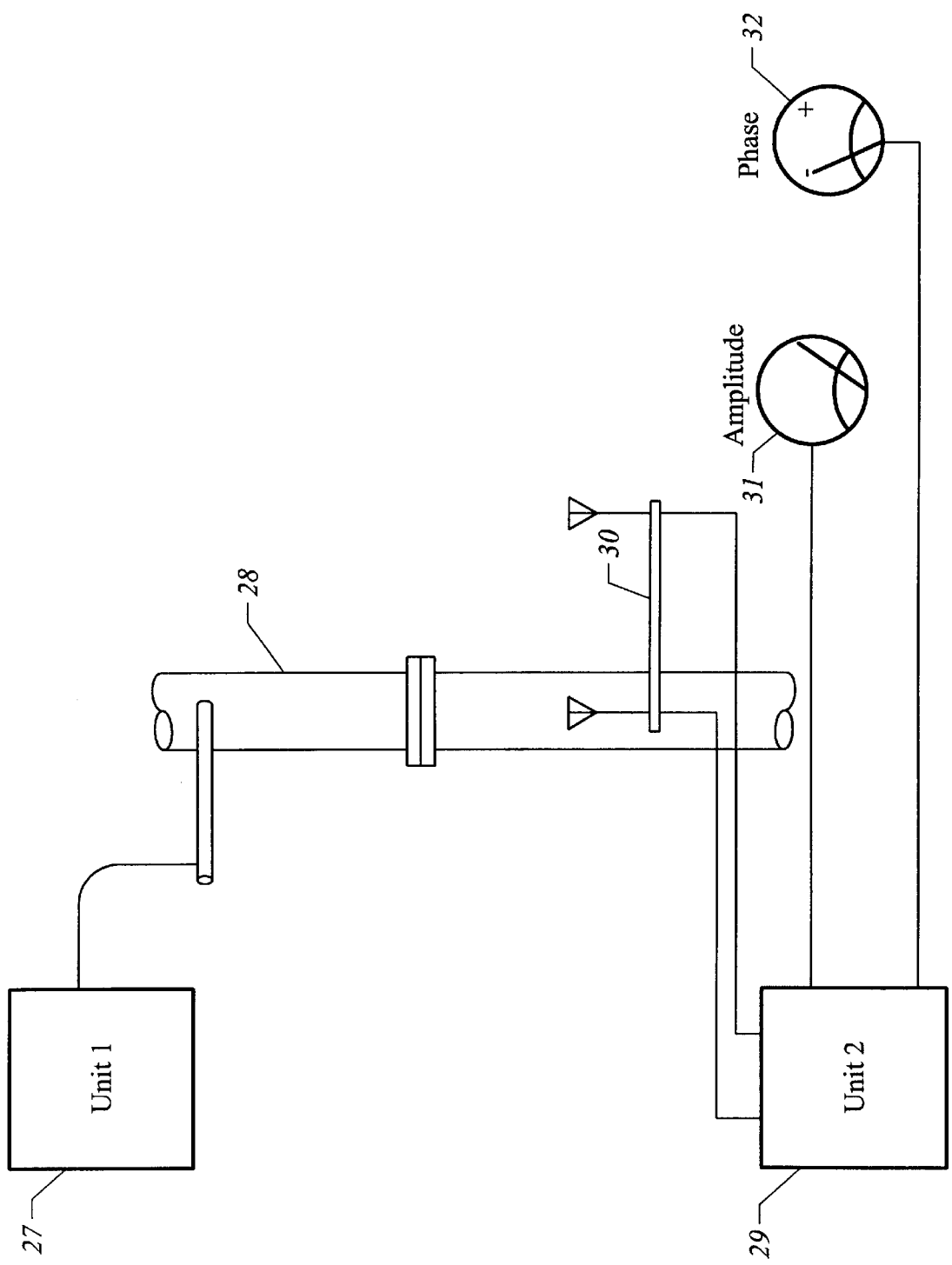
FIG. 5 illustrates the detection system when the antennas are to the right of the underground pipe, demonstrating the typical readings of the amplitude and phase indicators for this condition.

FIG. 3 illustrates the expected readings on the phase indicator 20 and amplitude indicator 19 when the antennas 17 from receiver 18 are to the left of the underground pipe 16. FIG. 4 illustrates the expected readings on phase indicator 26 and amplitude indicator 25 when antennas 24 of receiver 23 are equidistant from underground pipe 22. FIG. 5 illustrates expected readings on the phase indicator 32 and amplitude indicator 31 when antennas 30 are to the right of pipe 28. A transmitter unit is shown at 15, 21, and 27 in FIGS. 3, 4, and 5, respectively.

Thus, it is seen that the received signals from the receiver antennas are phase modulated by the switch connecting the received signals to the FM demodulator receiver. By phase comparing the demodulated signal to the switch reference signal, the relative position of the antennas with respect to the underground pipe can be determined, and an amplitude null of the demodulated signal indicates that the antennas are equidistant from the pipe.

While the invention has been described with respect to specific embodiments, the description is illustrative of the invention and is not to be construed as limiting the invention. Obviously the invention can be applied to above ground objects as well as underground objects. Thus, various modifications and applications may occur to those skilled in the art without departing from the true spirit and scope of the invention as defined by the appended claims.

What is claimed is:

1. A metal detection system comprising
a signal generator for generating an electrical signal at a first frequency,
an impedance matching network for coupling the electrical signal to a metal object,
first and second spaced receiver antennas for receiving signals at the first frequency radiated by the metal object,
an FM demodulator receiver,
a switch driven by a switch signal at a second frequency for alternately applying signals from the first and second spaced antennas to the FM demodulator receiver, the FM demodulator receiver producing a signal at the second frequency,
an amplitude detector for detecting the amplitude of the signal produced by the FM demodulator receiver, and
a phase indicator for comparing the phase of the signal produced by the FM demodulator receiver and the phase of the switch signal,
whereby the amplitude and phase of the signal produced by the FM demodulator receiver indicates position of the metal object with respect to the antennas.

2. The metal detection system as defined by claim 1 and further including
a band pass filter for applying the signal from the FM demodulator receiver to the amplitude detector and to the phase indicator.

3. The metal detection system as defined by claim 2 wherein the FM demodulator receiver receives a signal at the first frequency for demodulating the signals from the antennas.

4. The metal detection system as defined by claim 2 wherein the first frequency is from VLF to UHF.

5. The metal detection system as defined by claim 1 wherein the FM demodulator receiver receives a signal at the first frequency for demodulating the signals from the antennas.

6. The metal detection system as defined by claim 1 wherein the metal object is an underground pipe.

7. A method of detecting the location of a metal object comprising the steps of
a) applying an electrical signal to the metal object for transmission at a transmission frequency,
b) receiving the transmitted signal from the metal object with a pair of spaced antennas,
c) applying the received signals from the antennas through a switch to an FM demodulator, the switch alternately connecting the antennas at a switch frequency and thereby frequency modulating the received transmitted signal and whereby the FM demodulator produces a phase variable signal at the switch frequency depending on position of the spaced antennas with respect to the metal object,
d) detecting the amplitude of the phase variable signal whereby a null indicates that the antennas are equidistant from the metal object, and
e) detecting the phase of the phase variable signal whereby the phase indicates relative positioning of the antennas with respect to the metal object.

8. In an underground and above ground, metal and pipe locating system, means for generating a radio frequency signal, means for coupling the radio frequency signal to the underground or above ground metal or pipe, means for electrically driving the metal or pipe as a loss transmission line radiator, and means for locating the underground or above ground metal or pipe by receiving the signal radiated by the metal or pipe with two identical antennas being switched in response to a switch signal, FM demodulating the switched received signals to obtain a demodulated signal, and comparing the phase of the demodulated signal with the switch signal as a reference to indicate relative position of the antennas with respect to the metal or pipe.

9. The metal and pipe locating system of claim 8 and further including a switch for rapidly switching the output of the two identical antennas at a synchronized rate with a phase detection system whereby the switch phase modulates the composite signal from the two antennas.

10. The metal and pipe locating system of claim 8 and including a signal amplitude detector for indicating an amplitude null of the demodulated signal when the two antennas are equidistant from the group metal or pipe.

* * * * *